United States Patent [19]

McDonald et al.

[11] Patent Number: 5,270,897
[45] Date of Patent: Dec. 14, 1993

[54] PERSONNEL PROTECTION SYSTEM FOR ELECTRICAL POWER CONNECTIONS

[75] Inventors: Thomas M. McDonald, Monroe; W. Reid Smith-Vaniz, Darien, both of Conn.

[73] Assignee: Hubbell Incorporated, Orange, Conn.

[21] Appl. No.: 792,183

[22] Filed: Nov. 14, 1991

[51] Int. Cl.$^5$ ............................................. H02H 3/28
[52] U.S. Cl. ........................................ 361/45; 361/44; 361/93
[58] Field of Search ............... 361/42, 45, 87, 31, 361/18

[56] References Cited

U.S. PATENT DOCUMENTS 3,886,409  5/1975  Scarpino ........................ 361/42
4,138,707  2/1979  Gross ............................ 361/45

Primary Examiner—A. D. Pellinen
Assistant Examiner—S. Jackson
Attorney, Agent, or Firm—Jerry M. Presson; Joseph B. Lerch

[57] ABSTRACT

A personnel protection system for electrical connections is disclosed, which is of the type that differentially senses the current flow between the power lead and the return lead (or between two power loads) is provided with an unbalancing impedance which makes the current difference between the two leads sufficiently high to trip the device and cause the power to be disconnected. A utilization device is similarly provided with an imbalanced impedance. However, that impedance is calculated to counteract the current imbalance caused by the first impedance, so that when the cable is connected to the utilization device, the current balance between the two conductors is restored, and power connection is maintained in the cable. In addition, the current flow in the second impedance is sensed and, if it is not at the correct level, electrical power to the load is disconnected in the same manner as when an imbalance occurs. Thus, the system does not provide continuous power unless predetermined conditions considered safe for securing the power are fully satisfied.

16 Claims, 4 Drawing Sheets

PERSONNEL PROTECTION SYSTEM FOR ELECTRICAL POWER CONNECTIONS

FIELD OF THE INVENTION

The present invention relates generally to electrical power systems and, more particularly, concerns a system for protecting personnel against accidental electrical shock at an electrical power connection.

BACKGROUND OF THE INVENTION

There are many instances in which it is desirable to run an electrical power cable from a location at which a power source is located to a remote location. For example, this becomes necessary when utilizing AC power to operate portable power tools at a location remote from a building. Similarly, it is desirable to be capable of charging an electrical vehicle by running an electrical cable from a power source, such as an AC wall outlet to the location of the vehicle.

It has been a common practice to provide personnel protection devices against accidental electric shock in such cables in the case of a ground fault. Typically, such ground fault protection involves differential sensing of a current flow in the power lead and the return lead in the cable and disconnecting the power to the cable when the difference (an imbalance) exceeds a predetermined threshold value. Ground fault protection is effective to avoid electric shock when a person who is grounded accidently touches the power lead or the return lead. Resulting current flowing through the person will flow through one of these leads, but not the other, thereby causing tripping of the protection system, and protecting the individual against electrocution by turning off the power to the cable.

One form of personnel protection is particularly desirable. That is, to assure that no power is connected to the cable, unless the cable is connected to a utilization or load device. Various forms of mechanical interlocks have been utilized to make power at the remote end of the cable inaccessible, unless the cable is connected to a utilization device. However, such interlocks suffer from relatively low reliability, in that any mechanical failure of the interlock is likely to result in electric shock to an individual. Furthermore, the mechanical interlocks and their modes of operation are entirely visible and apparent to a user. Accordingly, mechanical interlocks are particularly vulnerable to being defeated by persons who simply do not want to be inconvenienced by the interlocks. This is often another source of personnel injury.

Broadly, it is an object of the present invention to avoid the shortcomings of prior personnel protection systems for electrical connections. It is specifically an object of the present invention to provide a personnel protection system in which power at the outlet of the cable is disconnected, unless the cable is connected to a utilization device.

It is another object of the present invention to provide a personnel protection system for power connections which disconnects power in the cable when the cable is not connected to a utilization device and which does not depend on mechanical interlocks.

It is another object of the invention to provide a system that will not furnish continuous electrical power unless safe conditions for receiving the power are fully satisfied.

It is yet another object of the present invention to provide a personnel protection system for electrical power connections which is readily retro-fitted in existing personnel protection systems.

It is yet another object of the present invention to provide a personnel protection system for electrical connections for disconnecting power to a cable when it is not connected to a utilization device, which system is convenient and reliable in use, not readily defeated, yet relatively simple and inexpensive in construction.

In accordance with the present invention, a personnel protection system for electrical connections which is of the type that differentially senses the current flow between the power lead and the return lead (or between two power leads) is provided with an unbalancing impedance which makes the current difference between the two leads sufficiently high to trip the device and cause the power to be disconnected. A utilization device is similarly provided with an imbalanced impedance. However, that impedance is calculated to counteract the current imbalance caused by the first impedance, so that when the cable is connected to the utilization device, the current balance between the two conductors is restored, and power connection is maintained in the cable. In addition, the current flow in the second impedance is sensed and, if it is not at the correct level, electrical power to the load is disconnected in the same manner as when an imbalance occurs. Thus, the system does not provide continuous power unless predetermined conditions considered safe for securing the power are fully satisfied.

BRIEF DESCRIPTION OF THE DRAWINGS

The foregoing brief description, as well as further objects, features, and advantages of the present invention will be understood more completely from the following detailed description of presently preferred, but nonetheless illustrative, embodiments, with reference being had to the drawings, in which.

DETAILED DESCRIPTION OF THE PREFERRED EMBODIMENTS

Figure 1:
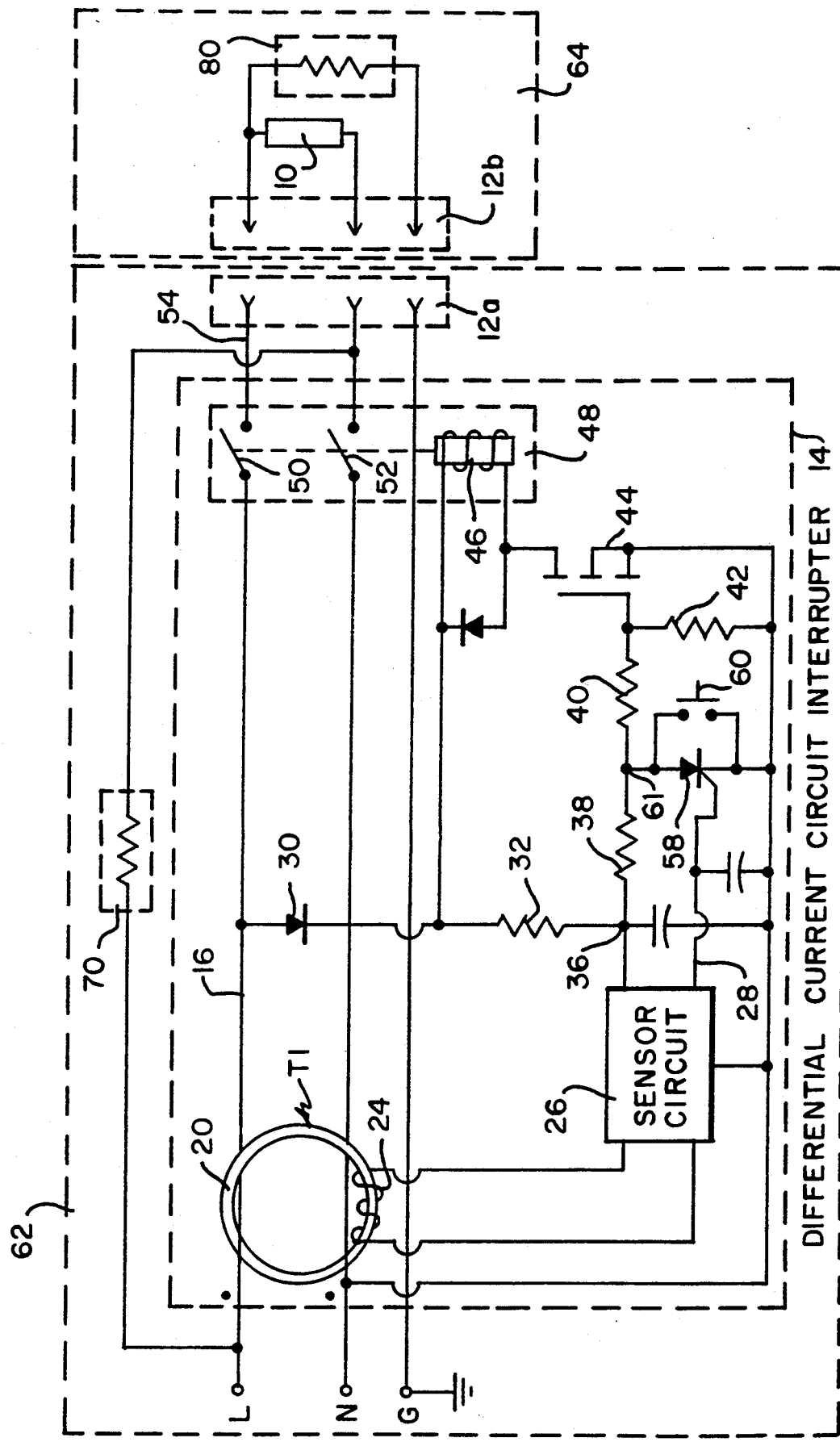
FIG. 1 is a simplified schematic diagram of a personnel protection system for power connections which demonstrates objects and features of the present invention.

FIG. 1 is a simplified schematic diagram illustrating the principals of the present invention in a personnel protection system for an electrical power connection. The connection is intended to connect an AC power source (e.g. 120 volts), which is not shown, but is assumed to be connected between the terminals L (power) and N (neutral or return), to a utilization device or load 10, such as an electrical vehicle to be charged.

Also provided is a ground terminal G, which is connected to ground at the location of the power source. The actual connection is made through the two mating halves 12a and 12b of a conventional power connector. Between the terminals L, N, G and the connector 12a, 12b, there is provided a conventional Differential Current Circuit Interrupter (DCCI) 14, which serves a personal protection function, as will be explained more fully below.

In normal operation, the currents flowing into terminals L and N will normally be equal and opposite, and the terminals L and N are connected through DCCI 14 and connector 12a, 12b to the load 10. On the other hand, should a ground fault occur at the load 10, as by a grounded user accidently touching one of the terminals of 12a, 12b, DCCI 14 will detect a current imbalance and will cause DCCI 14 to terminate the delivery of power to connector 12a, 12b.

However, when the connector sections 12a, 12b are separated, the terminals of the section 12a are exposed and the separate, open contacts of phase lines 54, 56 are accessible to anyone. The DCCI would not sense an imbalance under these circumstances, because the person would be connected across the power and return leads. This is considered to be a dangerous condition, since it is possible for accidental electric shock to occur should an individual contact the exposed terminals of the power and return leads of the connector section.

DCCI 14 is illustrated in general schematic form in order to describe its function to the extent necessary to understand the invention. In DCCI 14, a lead 16, which is connected to terminal L and a lead 18, which is connected to terminal N pass through a magnetic core 20 forming part of a transformer T1, and a lead 22 which is connected to the G terminal passes through the DCCI to connector section 12a. In addition, a sensing winding 24 is provided on T1 which essentially constitutes the secondary of the transformer, with conductors 16 and 18 being primaries. The current in winding 24 therefore corresponds to the vector sum of the currents in leads 16 and 18. Sensor circuit 26 is a conventional integrated circuit (e.g. a Raytheon RV 4145N), designed specifically to serve as a sensor circuit in a DCCI. It serves to provide a predetermined signal level on lead 28 when the differential current sense on lead 24 exceeds a predetermined level.

Diode 30, resistor 32 and capacitor 34 serve as a peak detector circuit connected between lead 16 and neutral. The voltage appearing at node 36 serves to power sensor circuit 26. That voltage is also applied to a voltage divider comprising the resistors 38, 40 and 42. This voltage divider applies a voltage to the gate of a field-effect power transistor driver 44 and biases the transistor in a conductive state. Transistor 44 drives the actuator coil 46 of a relay 48. Relay 48 further includes normally open contacts 50 and 52 which are closed when actuator 46 receives a driving current. Contact 50 connects lead 16 to lead 54 and contact 52 connects lead 18 to lead 56. Accordingly, lead 16 is connected to lead 54 and lead 18 is connected to 56 so long as actuator 46 receives sufficient driving current to close the contacts 50 and 52.

When the current sensed by its sensor circuit 26 exceeds the predetermined level as a result of a current imbalance, a voltage level is applied from lead 28 which causes SCR 58 to be fired. This essentially clamps the node 61 to approximately one volt above neutral voltage and causes transistor 44 to turn off. With transistor 44 turned off, the driving current to actuator 46 is removed and contacts 50 and 52 are released to their open condition, so that leads 54 and 56 are isolated from both L and N. After the condition causing the current imbalance is cleared, a pushbutton 60 is pressed to reset SCR 58 from its fired state, thereby permitting transistor 44 to turn on, to once more provide driving current, whereby switches 50 and 52 are closed once again.

In accordance with the present invention, an impedance 70 is connected so as to produce a current imbalance between leads 16 and 18 being sensed by core 20. Moreover, this imbalance is sufficiently high (preferably about 8 ma) to cause DCCI to isolate power from connector section 12a. At the same time, a second impedance 80 is provided at the load 10 and is designed to draw a current which is equal and opposite to that of load 70, so as restore balance between the currents drawn on leads 16 and 18. As a result of the addition of these two impedances, DCCI 14 will be in its balanced state when connector sections 12a and 12b are joined. However, if sections 12a and 12b are disconnected, an imbalance occurs in DCCI 14 which causes relay 48 to interrupt the power connection to connector portion 12a.

Although impedances 70 and 80 are shown as resistive, they need not be resistive for the invention to function. Furthermore, the connection of the impedances 70 and 80 in FIG. 1 are merely exemplary.

In the schematic diagram of FIG. 1, it has been assumed that the DCCI and impedance 70 are located in an assembly 62 which is intermediate the power source and assembly 64 including load 10. The cable connecting power source to assembly 64 would normally be included in assembly 62. However, those skilled in the art will appreciate that DCCI 14 and impedance 70 could be co-located with the power source, in which event the intermediate assembly 62 would include only the power cable connectors at either end required to make the connection to the power source and load, respectively (see e.g. FIG. 2).

In some instances, it may be undesirable to utilize the ground lead 22 to carry return current from impedance 80. Those skilled in the art will appreciate that this can be avoided by simply returning the bottom of impedance 80 to lead 18 a point to the left of core 20 (See e.g. FIG. 2).

Figure 2:
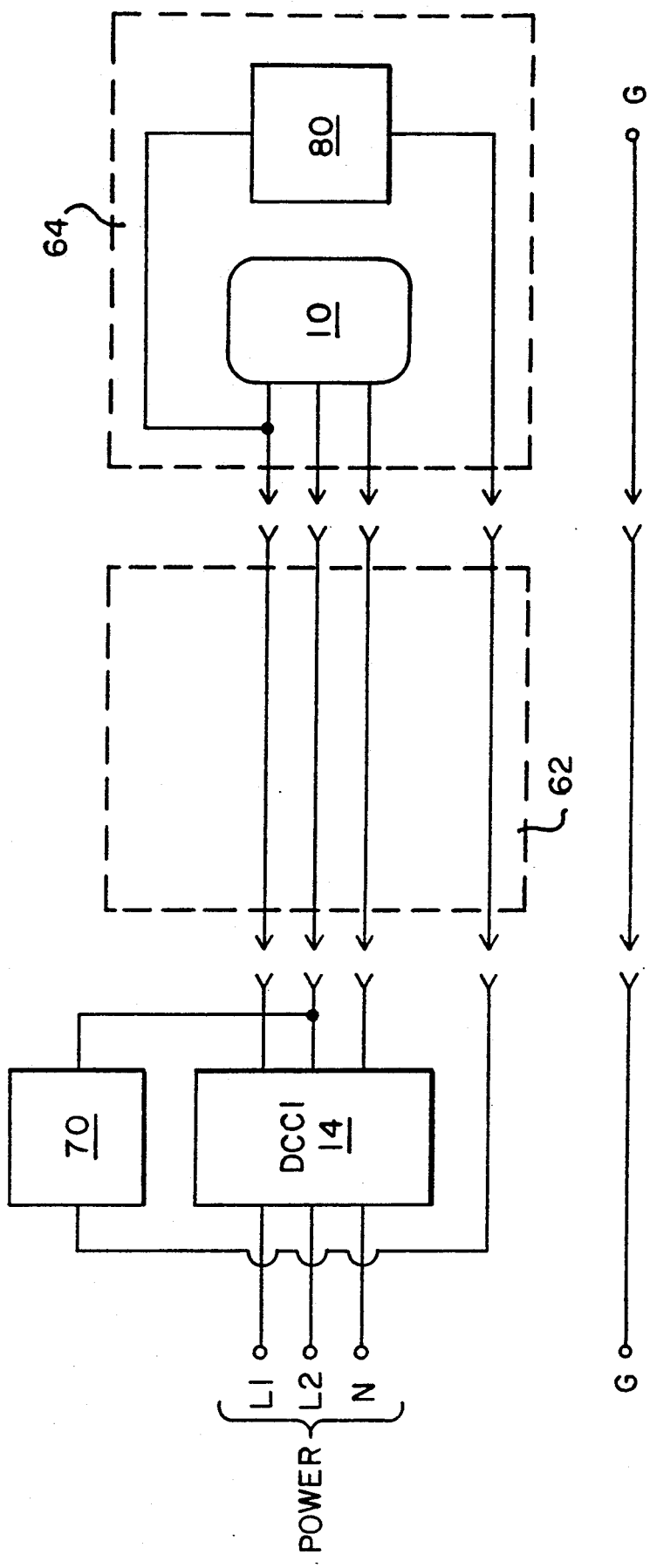
FIG. 2 is a simplified schematic diagram illustrating the system of FIG. 1 which may be modified for use with a pair of power conductors and a single return.
Figure 4:
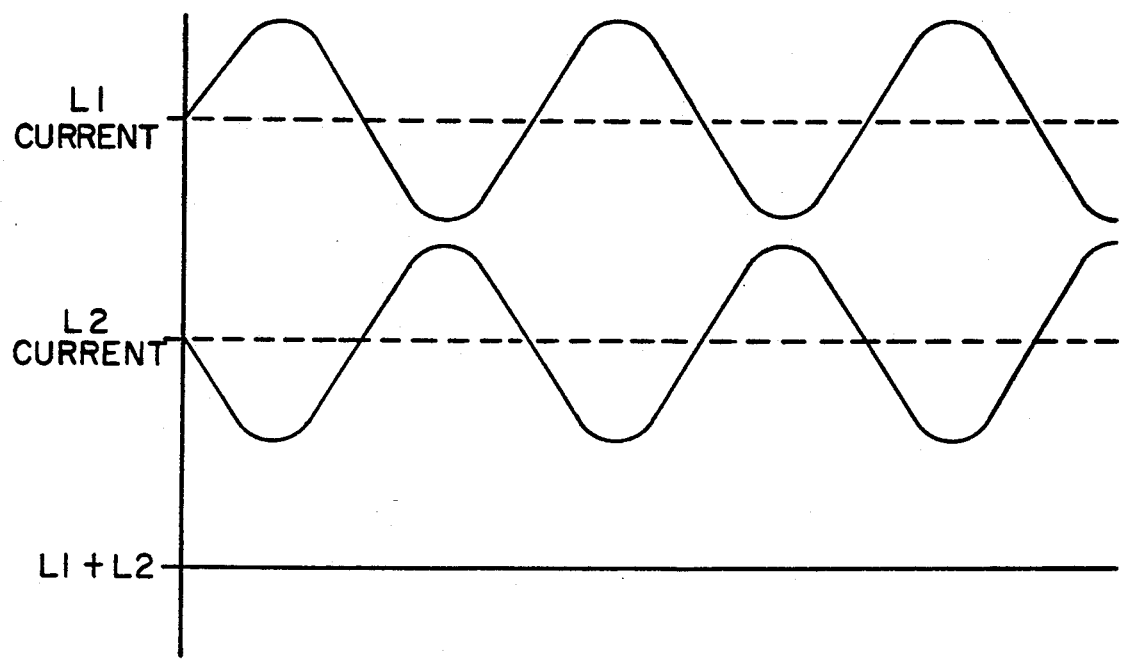
FIG. 4 illustrates the balancing relationship which is achieved between two conductors of the system which are out of phase.

In some applications, it may be desirable to utilize a power source which includes two power or ungrounded conductors (L1 and L2 in FIG. 2). As can be seen in FIG. 2, the present invention can then be realized by connecting the impedances 70 and 80 so they draw current from different power leads, in order to achieve the desired balance when the load is connected. This balance is achieved by taking advantage of the phase difference between the two power conductor connected to power conductors L1 and L2 respectively. As shown in FIGS. 4, the 180 degree phase difference between the currents in L1 and L2 causes the DCCI to be essentially balanced by the net current (L1+L2).

Figure 3:
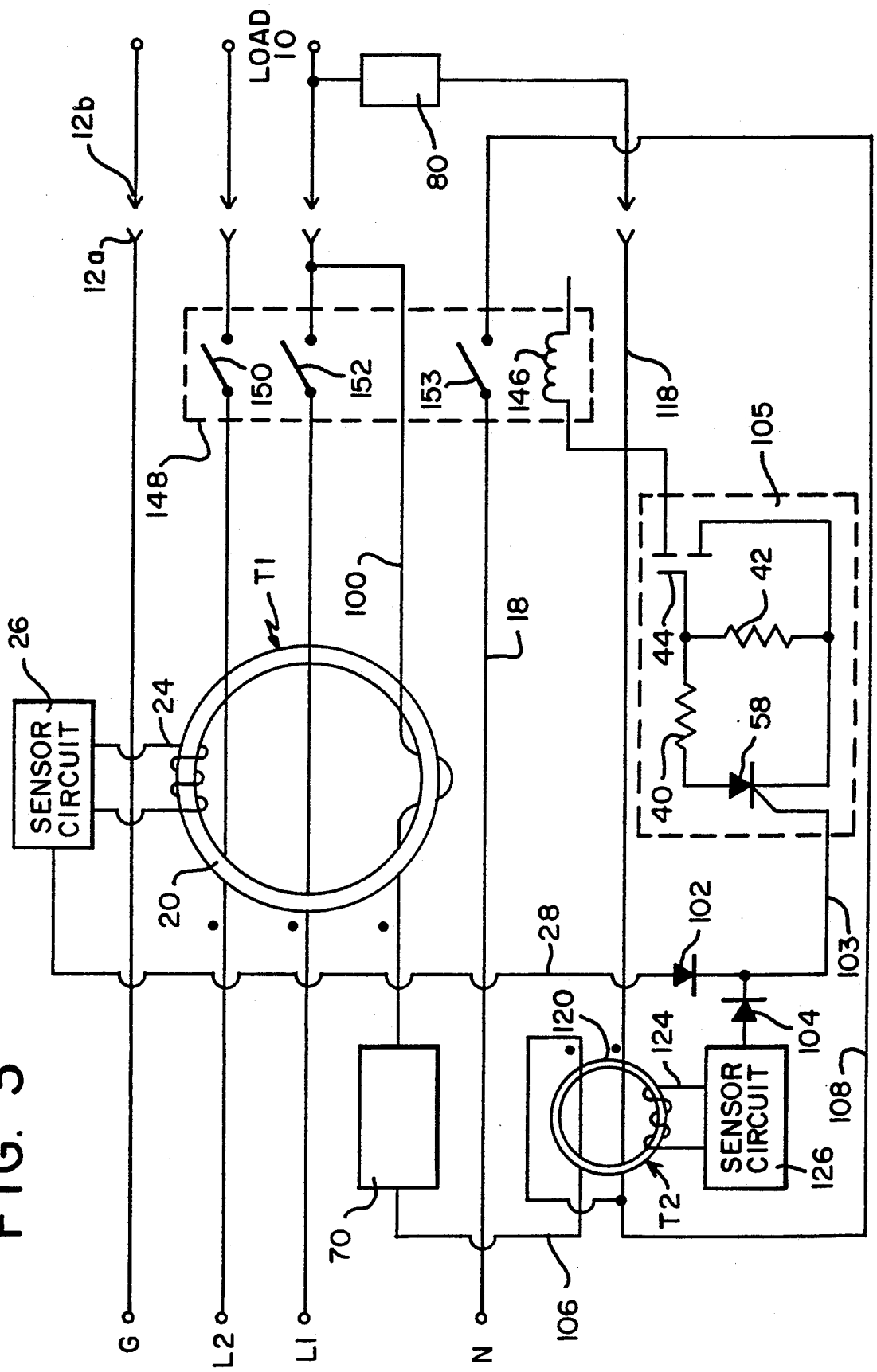
FIG. 3 is a simplified schematic diagram illustrating a preferred embodiment of the invention in which additional protection is provided to assure against electrical shock to an individual when the utilization device is disconnected from the power line.

FIG. 3 is a simplified schematic diagram of a preferred embodiment of the invention which introduces a further degree of personnel protection. In this embodiment, power is provided from the ungrounded power terminals L1 and L2 to load 10. A lead 118 serves as a pilot wire in a supplementary circuit which provides additional protection against accidental electrocution.

Power transmission leads L1 and L2 extend through the magnetic core 20 of transformer T1 and are connected through the contacts 150 and 152 of a relay 148 across the load 10. As was the case in FIG. 1, a sensor winding 24 and a sensor circuit 26 monitor the current balance of transformer T1 and sensor 26 produces a signal on lead 28 when the imbalance in the transformer exceeds a threshold level. This signal is applied through a diode 102 to a network 105. The network 105 represented schematically in FIG. 3 is intended to be a network such as the one comprising diode 30, resistors 32, 38, 40 and 42, capacitor 34, SCR 58, reset switch 60, and field-effect transistor 44 in FIG. 1.

The drive transistor 44 of network 105 drives the winding 146 of relay 148 in the same manner that it drives winding 46 of relay 48 in FIG. 1. The contacts 150, 152 and 153 are normally open, but are maintained in a closed position by their respective control core, as result of actuating current provided by transistor 44.

The additional personnel protection function in the embodiment of FIG. 3 is provided by means of a second core transformer T2 which has a coil 120 and sensor winding 124 connected to a sensor circuit 126, which is essentially identical to sensor circuit 26. Thus, sensor circuit 126 will provide an output signal when the sensed differential current exceeds a threshold value. This output signal is passed through diode 104 to lead 103.

By virtue of the diodes 102 and 104, the higher of the two signals appearing at the output of sensor circuit 26 and sensor circuit 126 will appear on lead 103. Thus, if either transformer T1 or transformer T2 has a current differential which exceeds the predefined threshold, SCR 58 will be fired, and drive current to winding 146 will be terminated in the manner described with respect to FIG. 1. This results in contacts 150, 152, and 153 being released to their open state, so that load 10 is isolated.

In this embodiment, the unbalancing impedance 70 for the DCCI including the transformer T1 is connected on the load side of lead 16 through contact 149 (closed during normal operation) and lead 100. Lead 100 has two turns traversing the core 120, for reasons to be discussed fully below. The return path to neutral for impedance 70 is through lead 106, which passes through core 20 of transformer T2 and lead 108, which is connected to neutral at the load side. A lead 118 also passes through core 20 and is connected to the bottom of load unbalancing impedance 80.

With the load 10 connected to the DCCI, impedances 70 and 80 will each draw a standard load (i.e. 8 ma). As a result, when the system is in balanced operation, lead 16 will draw 16 ma more than lead 116. Since lead 100 forms two turns in core 20, its current of 8 ma will have twice the effect on the sensor winding as 8 ma drawn in either lead 16 or lead 116. Since the current in lead 100 is opposite to the current drawn through lead 16 by impedances 70 and 80, and has essentially the effect of a current of 16 ma, it precisely balances out the additional 16 ma that lead 16 conducts. Accordingly, transformer T1 is balanced and would cause no interruption of the connection to load 10. In addition, since impedances 70 and 80 each draw a standard 8 ma load, and the currents they introduce in leads 106 and 118, respectively, are opposite, transformer T2 is also balanced and would cause no interruption of the connection to load 10.

Should the load 10 be disconnected from the DCCI, impedance 80 is removed, introducing an imbalance in both transformers T1 and T2. However, the transformer T2 does substantially more than provide redundant protection of the type offered by transformer T1 (although this alone would be an adequate reason for including T2). Transformer T2 also avoids false balance indications by transformer T1 under circumstances when the load is not connected and a dangerous operating condition exists. For example, if transformer T2 were not utilized, it would be possible for a grounded individual presenting an impedance on the order of impedance 80 to contact the output connection for lead 16 with load 10 not connected. Current flowing to the individual through transformer T1 would keep it in balance and prevent opening of switch 152. The individual would thus be subjected to the electrical shock hazard without the protection mechanism disconnecting him from the power source. With T2 present, assurance is provided that when T1 indicates a balance condition, current is in fact being returned from impedance 80, assuring that load 10 is, in fact, connected. In this instance, the lead 18 acts as a pilot wire to assure safe operation of the system.

Figure 5:
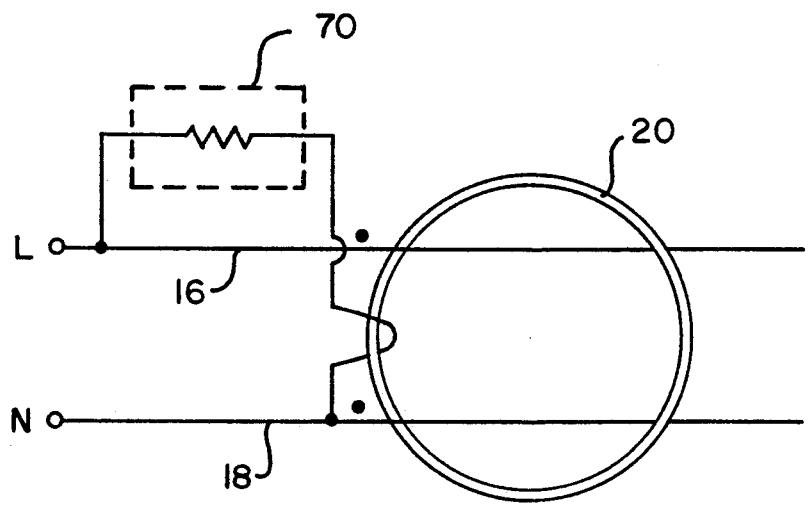
FIG. 5 illustrates, a modification to the system of FIG. 1, which permits the lead connections for each impedance to be on the same side of the core.

For some applications, it may be desirable to have the lead connections for the impedances 70 or 80 on the same side, that is the power side or load side of the core 20. This can be achieved by passing the lead or leads directly through the core with one or more turns and connecting them to the L and N conductors on that same side of the core. FIG. 5 illustrates, for example, illustrates a modification to FIG. 1 whereby the right hand lead of impedance 70 passes through the input side of the core 20 to create the imbalancing of DCCI. Otherwise, the system of FIG. 5 is identical to FIG. 1.

Although preferred forms of the invention have been disclosed for illustrative purposes, those skilled in the art will appreciate that many additions, modifications, and substitutions are possible without departing from the scope and spirit of the invention as defined in the accompanying claims.

What is claimed:

1. In a personnel protection system for an electrical connection between a source of power and a load, said connection including a plurality of conductors and a connector for said load, said personnel protection system being of the type sensing the balance of current flow in the said electrical conductors to interrupt current flow to said load upon the occurrence of a predefined imbalanced condition, the improvement comprising:

first impedance means connected to at least one of said electrical conductors on the power side of said connector for producing said imbalance condition;
   second impedance means connected to at least one of said electrical conductors on the load side of said connector for counteracting the imbalance condition produce by said first impedance means; and
   means responsive to current flow in said second impedance for interrupting current flow to said load when current flow in said second impedance is below a predefined threshold value.

2. A personnel protection system in accordance with claim 1, wherein said first impedance is connected between two of said conductors.

3. A personnel protection system in accordance with claim 2, said system being of the type in which the current balance is sensed by means of a transformer incorporating a toroidal core, at least two of said conductors passing through said core as primaries of said transformer, said first impedance being connected to one of said conductors on the power side of said transformer and to another said conductors on the load side of said transformer.

4. A personnel protection system in accordance with claim 3, said system being of the type in which the current balance is sensed by means of a transformer incorporating a toroidal core, at least two of said conductors passing through said core as primaries of said transformer, said first impedance being connected to one of said conductors and being in series circuit with a lead which is not one of said conductors and which passes through said core as a primary of said transformer.

5. A personnel protection system in accordance with claim 4, wherein said lead has more turns about said core than one of said conductors.

6. A personnel protection system in accordance with claim 2, said system being of the type in which the current balance is sensed by means of a transformer incorporation a toroidal core, at least two of said conductors passing through said core as primaries of said transformer, said first impedance being connected to one of said conductors on one of the power side and the load side of said transformer and to another of said conductors on the same side of said transformer.

7. A personnel protection system in accordance with claim 6, said system of the type in which the current balance is sensed by means of a transformer incorporating a toroidal core, at least two of said conductors passing through said core as primaries of said transformer, said first impedance being connected to one of said conductors and being in series circuit with a lead which is not one of said conductors and which passes through said core as a primary of said transformer.

8. A personnel protection system in accordance with claim 7, wherein said lead has more turns about said core than one of said conductors.

9. A personnel protection system in accordance with claim 1, wherein said first impedance is co-located with the source of power.

10. A personnel protection system in accordance with claim 1, wherein said first impedance is remote from the source of power and the load and is co-located with a cable connecting the two.

11. A personnel protection system in accordance with claim 1, wherein said first and second impedances are connected to different ones of said conductors.

12. A personnel protection system in accordance with claim 1, wherein said first and second impedances, at one end thereof, are connected to the same conductor.

13. A personnel protection system in accordance with claim 1, said system being of the type in which the current balance is sensed by means of a transformer incorporating a toroidal core, at least two of said conductors passing through said core as primaries of said transformer, said first impedance being connected to one of said conductors and being in series circuit with a lead which is not one of said conductors and which passes through said core as a primary of said transformer.

14. A personnel protection system in accordance with claim 13, wherein said lead has more turns about said core than one of said conductors.

15. A personnel protection system in accordance with claim 1, wherein said interrupting means is jointly responsive to current flow in said first and second impedances and said interruption occurs when the difference therebetween exceeds a predetermined threshold value.

16. A personnel protection system in accordance with claim 15, wherein said interrupting means comprises a second transformer including a second toroidal core, a lead in series circuit with said first impedance passing through said second core as a primary of said second transformer and a lead in series circuit with said second impedance passing through said second core as a primary of said second transformer.

* * * * *